US012764714B2

(12) United States Patent
Hong

(10) Patent No.: US 12,764,714 B2
(45) Date of Patent: Oct. 13, 2026

(54) METHOD AND APPARATUS FOR INFORMATION SENDING AND RECEIVING

(71) Applicant: Beijing Xiaomi Mobile Software Co., Ltd., Beijing (CN)

(72) Inventor: Wei Hong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 294 days.

(21) Appl. No.: 18/283,600

(22) PCT Filed: Mar. 22, 2021

(86) PCT No.: PCT/CN2021/082200

§ 371 (c)(1),
(2) Date: Sep. 22, 2023

(87) PCT Pub. No.: WO2022/198417

PCT Pub. Date: Sep. 29, 2022

(65) Prior Publication Data

US 2024/0163843 A1 May 16, 2024

(51) Int. Cl.

*H04W 68/02* (2009.01)
*H04W 8/18* (2009.01)
*H04W 8/22* (2009.01)
*H04W 76/20* (2018.01)

(52) U.S. Cl.

CPC ........... *H04W 68/02* (2013.01); *H04W 8/186* (2013.01); *H04W 8/22* (2013.01); *H04W 76/20* (2018.02)

(58) Field of Classification Search

CPC ...... H04W 68/02; H04W 76/20; H04W 8/186
USPC .......................................................... 455/458
See application file for complete search history.

(56) References Cited

U.S. PATENT DOCUMENTS

2020/0314707 A1 10/2020 Sakai
2021/0022111 A1* 1/2021 Kumar .................. H04W 68/02
2021/0120524 A1* 4/2021 Palle .................. H04W 68/005
2022/0210757 A1 6/2022 Hong
2022/0248213 A1 8/2022 Hong
2022/0312473 A1 9/2022 Hong

FOREIGN PATENT DOCUMENTS

CN 110214461 A 9/2019
CN 110463238 A 11/2019
CN 110622612 A 12/2019
CN 112469032 A 3/2021

OTHER PUBLICATIONS

ISA State Intellectual Property Office of the People's Republic of China, International Search Report Issued in Application No. PCT/CN2021/082200, Nov. 25, 2021, WIPO, 4 pages.

* cited by examiner

*Primary Examiner* — Joel Ajayi
(74) *Attorney, Agent, or Firm* — Volpe Koenig

(57) ABSTRACT

A method and apparatus for information sending and receiving. The information sending method comprises: sending a multi-SIM problem notification to a base station, wherein the multi-SIM problem notification is configured to notify the base station that a multi-SIM problem is currently occurring or will occur in a terminal.

16 Claims, 5 Drawing Sheets

METHOD AND APPARATUS FOR INFORMATION SENDING AND RECEIVING

CROSS REFERENCE TO RELATED APPLICATIONS

This application is a National Stage of International Application No. PCT/CN2021/082200, filed on Mar. 22, 2021, the disclosure of which is incorporated herein by reference in its entirety for all purposes.

TECHNICAL FIELD

The present disclosure relates to the field of communications technologies, and in particular, to a method and/or a device for sending and receiving information to/from an electronic device.

BACKGROUND

A terminal, such as a mobile phone, can interact with a base station based on a Subscriber Identity Module (SIM) card. Generally, the terminal may be a single-SIM terminal including a single SIM card, or a multi-SIM terminal including multiple SIM cards, which may belong to the same operator or different operators.

However, a multi-SIM problem may be raised such as the commonly occurred multiple SIM cards conflicting with the terminal that is operating the single or multi-SIM. For example, the performance may be degraded due to two or more SIM cards conducting communication at the same time. For another example, when one SIM card is conducting communication with the terminal, the terminal receives a paging for another SIM card.

In view of this, solving the multi-SIM problem in the terminal has become an urgent problem to be solved.

SUMMARY

In view of this, the embodiments of the present disclosure propose an information sending method and device, and an information receiving method and device to solve a technical problem, such as the multi-SIM problem, in the related art.

According to a first aspect of the embodiments of the present disclosure, an information sending method is provided and applied to a terminal. The method comprising: sending a multi-SIM problem notification to a base station, wherein the multi-SIM problem notification is configured to notify the base station that a multi-SIM problem is occurring or will occur in the terminal.

According to a second aspect of the embodiments of the present disclosure, an information receiving method is provided and applied to a base station. The method comprising: in response to receiving a multi-SIM problem notification sent by a terminal, determining that a multi-SIM problem is occurring or will occur in the terminal.

According to a third aspect of the embodiments of the present disclosure, an information sending device is provided and applied to a terminal. The device comprising: a notification sending module, configured to send a multi-SIM problem notification to a base station, wherein the multi-SIM problem notification is configured to notify the base station that a multi-SIM problem is occurring or will occur in the terminal.

According to a fourth aspect of the embodiments of the present disclosure, an information receiving device is provided and applied to a base station. The device comprising: a notification receiving module, configured to determine that a multi-SIM problem is occurring or will occur in a terminal in response to receiving a multi-SIM problem notification sent by the terminal.

According to a fifth aspect of the embodiment of the present disclosure, an electronic device is provided, comprising: a processor; a memory for storing processor executable instructions. Wherein the processor is configured to implement at least one of the information sending method and/or the information receiving method described above.

According to a sixth aspect of the embodiment of the present disclosure, a non-transitory computer-readable storage medium is provided, on which a computer program is stored, and when the program is executed by the processor, the steps of the information sending method and/or the information receiving method are implemented.

According to the embodiments of the present disclosure, a terminal may notify a base station when a multi-SIM problem is occurring or will occur, so that the base station knows that a multi-SIM problem is occurring or will occur in the terminal. Therefore, the base station can determine whether the specific multi-SIM problem needs to be acquired from the terminal according to its own condition. Based on this, the multi-SIM problem is solved for the terminal in a targeted manner. Thus, improving the terminal's efficiency and user experience.

BRIEF DESCRIPTION OF DRAWINGS

In order to illustrate the technical solutions in the embodiments of the present disclosure more clearly, the attached drawings to be used in the description of the embodiments will be briefly introduced below, and obviously, the drawings in the following description are only some embodiments of the present disclosure, and those skilled in the art may further obtain other drawings according to these drawings without creative labor.

DETAILED DESCRIPTION

In the following, the technical solutions in the embodiments of the present disclosure will be clearly and completely described with reference to the attached drawings in the embodiments of the present disclosure. Obviously, the described embodiments are only a part of the embodiments, but not all of the embodiments of the present disclosure. Based on the embodiments of the present disclosure, all other embodiments obtained by those of ordinary skill in the art without creative work fall within the scope of the present disclosure.

Figure 1:
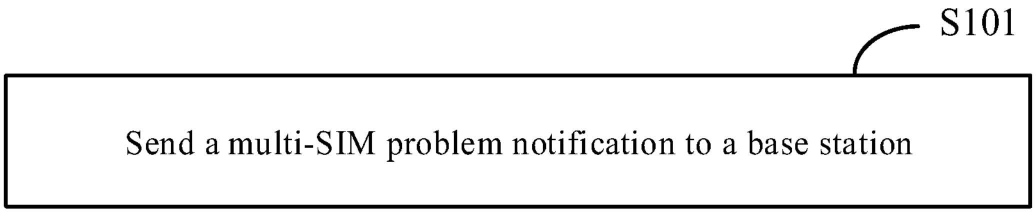
FIG. 1 illustrates a schematic flow chart of an information sending method according to an embodiment of the present disclosure.

FIG. 1 is a schematic flow chart of an information sending method according to an embodiment of the present disclosure. The information sending method shown in this embodiment may apply to a terminal, and the terminal comprises but is not limited to an electronic device such as a mobile phone, a tablet computer, a wearable device, a sensor, an Internet of Things device, and the like. The terminal may communicate as a user device with a base station, and the base station comprises but is not limited to a 4G base station, a 5G base station and a 6G base station. In one embodiment, the base station may be a base station to which the information sending method described in any of the subsequent embodiments applies.

As shown in FIG. 1, the information sending method may comprise the following step S101.

In step S101, a multi-SIM problem notification is sent to a base station. Wherein the multi-SIM problem notification is configured to notify the base station that a multi-SIM problem is occurring or will occur in the terminal.

In an embodiment, a terminal may be a multi-SIM terminal configured with at least two SIM cards, for example, the terminal is configured with a first SIM card and a second SIM card. Generally, a terminal may implement multiple SIM cards in various ways, such as dual-card single-standby, dual-card dual-standby single-pass, dual-card dual-standby dual-pass, etc.

When a terminal implements multiple cards, a multi-SIM problem may occur. For example, a communication conflict occurs in communication operations corresponding to the first SIM card and the second SIM card. Wherein a communication operation may be, listening for paging messages, responding to paging messages, measuring signals, receiving system information, tracking area updates, service transmissions, etc.

In an embodiment, a communication conflict may be a conflict that occurs in listening for paging among multiple SIMs of the terminal. For example, if a terminal is configured with a first SIM card and a second SIM card, when the paging occasions overlap, a conflict in listening for paging messages between the first SIM card and the second SIM card may occur.

A communication conflict may occur when one SIM in the terminal is performing a communication operation and the other SIM card is also required to perform a communication operation. For example, if a terminal is configured with a first SIM card and a second SIM card, the communication conflict may comprise one or more of the following: the communication operation of the first SIM card conflicts with the paging message listening of the second SIM card; the communication operation of the first SIM card conflicts with the paging message response of the second SIM card; the communication operation of the first SIM card conflicts with the measuring signal of the second SIM card; the communication operation of the first SIM card conflicts with the system information receiving of the second SIM card; the communication operation of the first SIM card conflicts with the area updates tracking of the second SIM card; and/or the communication operation of the first SIM card conflicts with the service transmission of the second SIM card.

The included multi-SIM problems are only exemplary illustration, and in practical applications, a terminal may also have other multi-SIM problems, which will not be described here.

In an embodiment, a terminal may send a multi-SIM problem notification to the base station when it is determined that the multi-SIM problem is occurring or will occur in the device. In response to receiving a multi-SIM problem notification sent by the terminal, a base station determines that multi-SIM problem is occurring or will occur in the terminal.

According to the above embodiment, when the multi-SIM problem is occurring or will occur in a terminal, the terminal may notify the base station so that the base station knows that a multi-SIM problem is occurring or will occur in the terminal. Therefore, the base station can determine whether the specific multi-SIM problem needs to be acquired from the terminal according to its own condition. Thus, the multi-SIM problem is solved for the terminal in a targeted manner, and the terminal and user experience are improved.

In an embodiment, a terminal may send a multi-SIM problem notification to a base station when it determines that any multi-SIM problem is occurring or will occur. When determining the multi-SIM problem that is occurring or will occur, a terminal may further determine whether to send the multi-SIM problem notification to a base station according to the specific multi-SIM problem. For example, the terminal may determine whether to send the multi-SIM problem notification based on whether the multi-SIM problem belongs to the candidate multi-SIM problems specified by the base station.

In an embodiment, a base station may first determine one or more candidate multi-SIM problems. In an example, a base station may determine the one or more candidate multi-SIM problems based on the capability information of the base station. For example, the base station may determine the multi-SIM problems it can solve based on its capability information, and use the multi-SIM problems as candidate multi-SIM problems. For example, if the base station has a suspend mechanism, the multi-SIM problem in the terminal that the communication operation of the first SIM card conflicts with the paging message response of the second SIM card can be solved, i.e. the terminal can suspend the communication operation of the first SIM card and respond to the paging message of the second SIM card. After determining the candidate multi-SIM problems, a base station may send the determined candidate multi-SIM problems to a terminal.

A terminal may receive one or more candidate multi-SIM problems sent by a base station; and in response to determining that the multi-SIM problem which is occurring or will occur belongs to the candidate multi-SIM problems, send the multi-SIM problem notification to the base station.

Therefore, when a terminal determines that a multi-SIM problem is occurring or will occur, the terminal can first judge whether the multi-SIM problem belongs to the candidate multi-SIM problems. If the determination is yes, the terminal sends a multi-SIM problem notification to the base station; and if not, the terminal does not send any multi-SIM problem to the base station.

For example, a base station may determine one or more candidate multi-SIM problems based on its own capability information, and form a candidate multi-SIM problem list. Then the base station sends the candidate multi-SIM problem list to a terminal. Therefore, the terminal can receive and save the candidate multi-SIM problem list. Subsequently, when a multi-SIM problem is occurring or will occur in the terminal, the terminal can query whether the occurring or to-be-occurring multi-SIM problem exists in the candidate multi-SIM problem list, and if so, send a multi-SIM problem notification to the base station.

According to the above embodiments, the base station may pre-specify the candidate multi-SIM problems. Based on this, the terminal does not report whenever any multi-SIM problem occurs, but reports when one of the candidate multi-SIM problems occurs. Thus, for a non-candidate multi-SIM problem, even if the terminal reports the multi-SIM problem notification to the base station, the base station does not need to know the information so far, which wastes communication resources. Thus, according to the above embodiments, it is possible to reduce unnecessary notifications sent by terminals, and the communication efficiency between a base station and a terminal can be improved. Thus, improving the system.

In an embodiment, a terminal may report the specific multi-SIM problem to a base station according to the request from the base station, which is described below with reference to FIG. 2.

Figure 2:
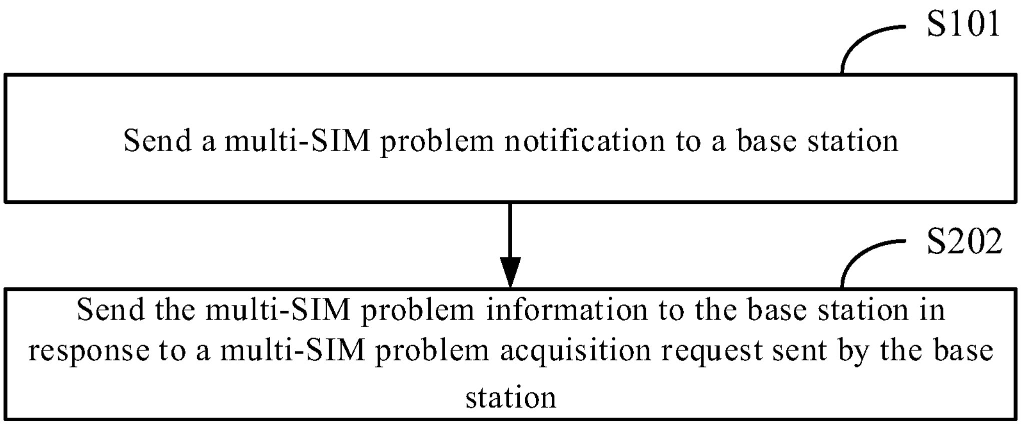
FIG. 2 illustrates a schematic flow chart of another information sending method according to an embodiment of the present disclosure.

FIG. 2 is a schematic flow chart of another information sending method according to an embodiment of the present disclosure. As shown in FIG. 2, the information sending method may include S101 and further comprise the following step S202.

In step S202, in response to a multi-SIM problem acquisition request sent by the base station, the multi-SIM problem information is sent to the base station. Wherein the multi-SIM problem information indicates at least one multi-SIM problem is occurring or will occur in the terminal.

In an embodiment, after receiving a multi-SIM problem notification of the terminal, the base station may determine that a multi-SIM problem is occurring or will occur in the terminal. Therefore, the base station may send a multi-SIM problem acquisition request to the terminal to acquire the specific multi-SIM problem.

In an example, a base station may determine whether to request a terminal to acquire a multi-SIM problem according to its own specific condition, for example, the base station may determine whether to request a terminal to acquire a multi-SIM problem according to the load of the base station. For example, if the load of the base station is higher than the preset load threshold, the base station may not request a terminal to acquire the multi-SIM problem, or the base station may postpone to request the terminal to acquire the multi-SIM problem. The postponing time may be determined according to the load, for example, until the load of the base station is not higher than the preset load threshold. Additionally, if the load of the base station is not higher than the preset load threshold, the base station may directly request a terminal to acquire a multi-SIM problem. The preset load threshold may be pre-determined according to the actual condition, which is not limited in this embodiment.

In an example, a base station may also determine whether to request a terminal to acquire a multi-SIM problem according to the condition of the terminal. For example, a base station may determine whether to request a terminal to acquire a multi-SIM problem according to the location of the terminal. For example, if the terminal is at the edge of the cell or the base station predicts that the terminal is about to leave the cell, then the base station may not request the terminal to acquire the multi-SIM problem; if the terminal is at the center of the cell, the base station may request the terminal to acquire the multi-SIM problem.

It should be noted that, the included method for the base station to determine whether to request the terminal to acquire multi-SIM problems is only an exemplary description, and is not specifically limited. The base station may also make a judgment according to other conditions, such as combining the conditions of the base station itself and the condition of the terminal, which will not be described here.

In an embodiment, a base station may send a multi-SIM problem acquisition request to a terminal through a radio resource control (RRC) signaling. In an example, a base station may carry the multi-SIM problem acquisition request in the UEInformationRequest signaling to be sent to the terminal. For example, a base station may add a new information unit, for example, a MUSIMProblemReq information unit, in the UEInformationRequest signaling of the related art, and carry the multi-SIM problem acquisition request in the information unit.

For example, a base station may carry an identifier for indicating whether to request to acquire a multi-SIM problem in the MUSIMProblemReq information unit, for example, if the identifier is 0, it means that no multi-SIM problem is requested, and if the identifier is 1, it means that a multi-SIM problem is requested. Alternatively or additionally, the base station may also indicate whether to request to acquire a multi-SIM problem by whether to send the UEInformationRequest signaling, for example, sending the UEInformationRequest signaling indicates to request the multi-SIM problem, and not sending the UEInformationRequest signaling indicates not to request the multi-SIM problem.

In an embodiment, after receiving a multi-SIM problem acquisition request sent by a base station, the terminal may send multi-SIM problem information to the base station. Wherein the multi-SIM problem information indicates at least one multi-SIM problem is occurring or will occur in the terminal. In an embodiment, a terminal may send multi-SIM problem information to a base station through UEInformationResponse signaling. For example, a new information unit, such as a MUSIMProblemReport information unit, may be added to the UEInformationResponse signaling to send multi-SIM problem information.

The multi-SIM problem information may comprise at least one problem identifier corresponding to the at least one multi-SIM problem respectively. Thus, the base station can determine each multi-SIM problem which is occurring or will occur in the terminal based on the problem identifier. For example, the base station stores the correspondence relationships between the problem identifiers and the multi-SIM problems in advance, and the correspondence relationships may be determined by a method such as protocol provisions or pre-negotiation between the base station and the terminal, so that after receiving the multi-SIM problem information, the base station may determine various multi-SIM problems that is occurring or will occur in the terminal based on the problem identifier carried therein. According to the above embodiment, the base station may send the problem identifier rather than send a specific problem, thus reducing the amount of data and improving the information transmission efficiency.

The multi-SIM problem information sent by a terminal to a base station may be used to request the base station to solve the at least one multi-SIM problem in the terminal. In an embodiment, a base station may solve the at least one multi-SIM problem in a terminal based on the multi-SIM problem information.

In an example, after receiving the multi-SIM problem information, the base station may analyze each of the multi-SIM problems and determine whether the base station can solve the multi-SIM problem. If the base station determines that the multi-SIM problem can be solved, the base station may determine the configuration information for solving the multi-SIM problem. Thus, the base station may send the determined configuration information for solving the one multi-SIM problem to the terminal.

The configuration information determined by the base station may solve one or more multi-SIM problems, and the base station may send one or more types of configuration information to the terminal, which is not limited in this embodiment.

In an example, a terminal may receive configuration information sent by a base station and configure the configuration information to solve at least one multi-SIM problem. The terminal may also send other information to the base station to assist the base station in solving multi-SIM problems. For example, the multi-SIM problem information to be sent by the terminal may comprise at least one of the at least one multi-SIM problem, the cause of the at least one multi-SIM problem, the frequency of the at least one of the multi-SIM problems, the solution for the at least one multi-SIM problems, the configuration information related to a multi-SIM function of the terminal, and identity information of the terminal.

In an example, the cause, the frequency, and the solution of the multi-SIM problem may be specific to each multi-SIM problem, and may be carried in the multi-SIM problem information in a manner corresponding to the multi-SIM problems. For example, a terminal may send the information to the base station in the form of a table, and for example, at least one of a problem identifier, a cause, a frequency, and a solution of a multi-SIM problem may be carried in each entry of the table.

In an example, the configuration information related to the multi-SIM function of the terminal, the identity information of the terminal, and the like may be terminal-specific information, which may be separately carried in the multi-SIM problem information, and does not need to be carried corresponding to the multi-SIM problem. For example, the configuration information related to the multi-SIM function may comprise the number of multi-SIMs configured in the terminal, the network standard of each SIM card, etc., and the identity information of the terminal may comprise the International Mobile Equipment IMEI of the terminal, the integrated circuit card identification code ICCID of the SIM card configured in the terminal, etc.

In an embodiment, a base station may solve the multi-SIM problem in the terminal according to the multi-SIM problem information sent by the terminal. For example, the base station may determine whether to solve the multi-SIM problem in the terminal or which method to use to solve the multi-SIM problem based on the cause and the frequency of the multi-SIM problem in the terminal; or the solution for the multi-SIM problem reported by the terminal may be regarded as a solution recommended by the terminal, and the base station may determine whether to adopt the solution recommended by the terminal, and if not, the base station may determine other solutions to solve the multi-SIM problem in the terminal.

In an embodiment, the method of sending a multi-SIM problem notification from a terminal to a base station may comprise multiple methods, which are described below with reference to FIGS. 3 and 4.

Figure 3:
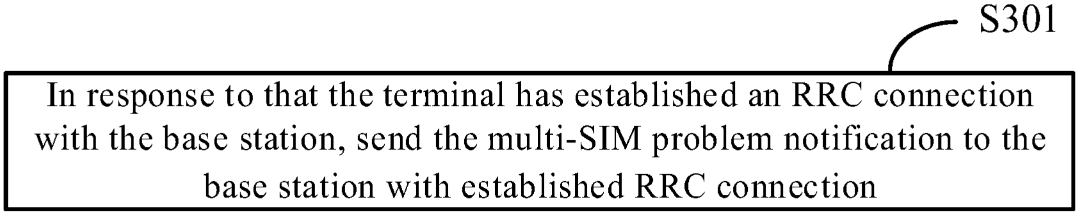
FIG. 3 illustrates a schematic flow chart of another information sending method according to an embodiment of the present disclosure.

FIG. 3 is a schematic flow chart of another information sending method according to an embodiment of the present disclosure. As shown in FIG. 3, the sending a multi-SIM problem notification to a base station may comprise step S301.

In step S301, in response to that the terminal has established a RRC connection with the base station, sending the multi-SIM problem notification to the base station with established RRC connection.

In an embodiment, a terminal may send the multi-SIM problem notification to a base station after the RRC connection with the base station is established. In an example, a terminal may send a multi-SIM problem notification to a base station through RRC signaling immediately after the RRC connection is established. In an example, a terminal may not consider the time of sending the multi-SIM problem notification, but send the multi-SIM problem notification to the base station after discovering that it has a multi-SIM problem or is about to have a multi-SIM problem.

In an example, the terminal may be a multi-SIM terminal. Here, the terminal is configured with at least two SIM cards, and RRC connections are respectively established with at least two base stations through the at least two SIM cards.

In an example, sending the multi-SIM problem notification to a base station with an established RRC connection comprises: sending the multi-SIM problem notification to at least one of the base stations with an established RRC connection; or sending the multi-SIM problem notification to each of the base stations with an established RRC connection.

For example, a terminal is configured with a first SIM card and a second SIM card, and establishes a RRC connection with a first base station through the first SIM card, and establishes a RRC connection with a second base station through the second SIM card. In an example, the terminal may select one or more of the first base station and the second base station, and send the multi-SIM problem notification to the selected base station(s). For example, the selection of a base station by the terminal may be according to the load of the base station or the received signal power of the base station. For example, a base station whose load meets a preset threshold and whose receiving signal power also meets a preset threshold may be selected, and the multi-SIM problem notification may be sent to the selected base station; or the selection of a base station by the terminal may be according to the capability of the base station to solve the multi-SIM problem. For example, if the terminal determines that the base station has the capability to solve the multi-SIM problem, the terminal sends a multi-SIM problem notification to the base station. Alternatively, in another example, the terminal may not do the selection, but directly send the multi-SIM problem notification to each base station respectively (i.e., the first base station and the second base station).

According to the above embodiment, the terminal may send the multi-SIM problem notification to the base station after completing the RRC connection establishment with the base station, so that the base station may determine whether it needs to acquire the specific multi-SIM problem from the terminal according to its own condition. This solves the multi-SIM problem in the terminal in a targeted manner and improves user experience.

Figure 4:
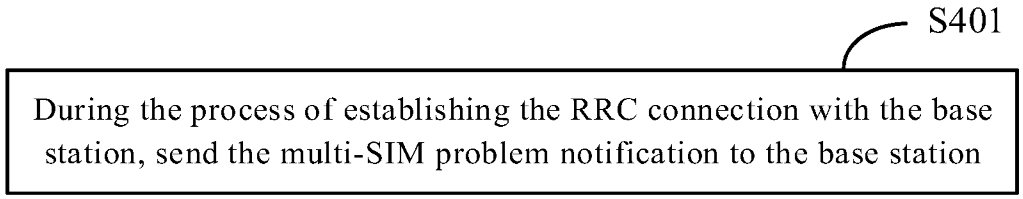
FIG. 4 illustrates a schematic flow chart of another information sending method according to an embodiment of the present disclosure.

FIG. 4 is a schematic flow chart of another information sending method according to an embodiment of the present disclosure. As shown in FIG. 4, sending the multi-SIM problem notification to the base station may comprise step S401.

In step S401, during the process of establishing the RRC connection with the base station, the multi-SIM problem notification is sent to the base station.

In an embodiment, the terminal may send the multi-SIM problem notification in the RRC signaling that establishes the RRC connection with the base station. Additionally, the terminal may carry the multi-SIM problem notification in a specified RRC message sent to the base station that indicates that the RRC connection establishment is complete. For example, when the terminal is reconfigured, the specified RCC message may be at least one of RRCConnectionReconfigurationComplete signaling and RRCReconfigurationComplete signaling; When the terminal reestablishes the connection, the specified RRC message may be at least one of RRCConnectionReestablishmentComplete signaling and RRCReestablishmentComplete signaling; When the terminal resumes the connection, the specified RRC signaling may be at least one of RRCConnectionResumeComplete signaling and RRCResumeComplete signaling; When a terminal establishes a connection with a base station for the first time, the specified RRC signaling may be at least one of RRCConnectionSetupComplete signaling and RRCSetupComplete signaling.

The RRC signaling is only an exemplary description, and in practical applications, there may also be other signaling used to indicate the completion of the connection establishment, which is not limited to this embodiment.

In an example, a terminal carrying the multi-SIM problem notification in the specific RRC message comprises: adding an information unit for carrying the multi-SIM problem notification in the specific RRC message.

For example, the terminal may add an information unit, such as MUSIMProblemAvailable, in the specific RRC message, and then may carry the multi-SIM problem notification in the added information unit. For example, the multi-SIM problem notification may carry an identifier bit for identifying whether the multi-SIM problem is occurring or will occur in the terminal. For example, when the identifier bit is 1, it indicates that there is a multi-SIM problem that is occurring or will occur in the terminal, and when the identification bit is 0, it indicates that there is not a multi-SIM problem, which is occurring or will occur.

In an embodiment, a terminal may carry the multi-SIM problem notification in a RRC connection establishment request, wherein the RRC connection establishment request is sent to the base station, and the base station is instructed to determine whether to establish a RRC connection with the terminal or not based on the multi-SIM problem notification. For example, the RRC connection establishment request may be a random access message, for example, randomly accessing message 3 in the messages. Alternatively, the RRC connection establishment request may be another message, which is not limited to this embodiment.

In an embodiment, a base station may receive the RRC connection establishment request carrying the multi-SIM problem notification sent by the terminal. Thus, the base station may determine whether to establish a RRC connection with the terminal or not based on the multi-SIM problem notification.

After receiving a multi-SIM problem notification, the base station may determine that a multi-SIM problem is occurring or will occur in the terminal. Thus, the base station may determine whether to establish a RRC connection with the terminal according to its own capability.

In an example, a base station may determine whether to establish a RRC connection with a terminal according to whether the base station itself has the capability of solving the multi-SIM problem. If the base station has the capability of solving the multi-SIM problem, the base station accepts the establishment of a RRC connection with the terminal. Alternatively, if the base station does not have the capability of solving the multi-SIM problem, the base station refuses to establish a RRC connection with the terminal. For example, the base station may refuse a RRC connection establishment request from the terminal.

In an example, a base station may determine whether to establish a RRC connection with a terminal according to its own load. For example, when the load of the base station is relatively high, and the multi-SIM problem cannot be solved for the terminal so far, the base station may refuse to establish a RRC connection with the terminal. When the load of the base station is relatively low and the multi-SIM problem can be solved for the terminal, the base station may accept the establishment of a RRC connection with the terminal.

According to the above embodiment, the base station may determine whether to establish a RRC connection with the terminal according to the multi-SIM problem notification reported by the terminal. Thus, preventing the terminal from accessing a base station that cannot solve the multi-SIM problem, thereby improving the efficiency of the system and user experience.

Figure 5:
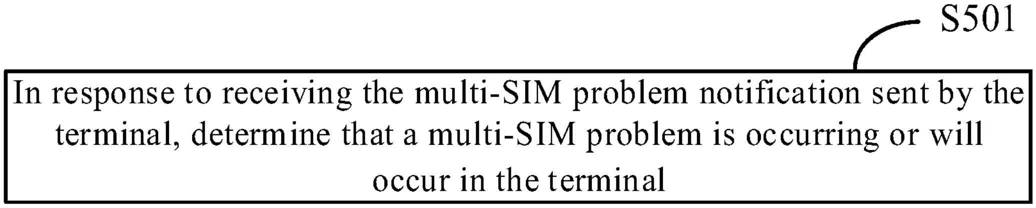
FIG. 5 illustrates a schematic flow chart of an information receiving method according to an embodiment of the present disclosure.

FIG. 5 is a schematic flow chart of an information receiving method according to an embodiment of the present disclosure. The information receiving method shown in this embodiment may be applied to a base station, and the base station comprises, but is not limited to, a 4G base station, a 5G base station, and a 6G base station. The base station may communicate with a terminal serving as a user device, and the terminal comprises, but is not limited to, electronic devices such as a mobile phone, a tablet computer, a wearable device, a sensor, and an Internet of Things device. In an embodiment, the terminal may be a terminal to which the information receiving method of any one of the above embodiments applies.

As shown in FIG. 5, the information receiving method may comprise the following step S501.

In step S501, in response to receiving the multi-SIM problem notification sent by the terminal, determining that a multi-SIM problem is occurring or will occur in the terminal.

In an embodiment, a terminal may send a multi-SIM problem notification to a base station if it determines that a multi-SIM problem is occurring or will occur in the terminal. Therefore, after receiving the multi-SIM problem notification sent by the terminal, the base station can determine that the multi-SIM problem is occurring or will occur in the terminal.

Accordingly, the base station can learn that the multi-SIM problem is occurring or will occur in the terminal. Thus, the base station can determine whether it needs to acquire the specific multi-SIM problem from the terminal according to its own condition. This solves the multi-SIM problem in the terminal in a targeted manner and improves user experience and system efficiency.

In an embodiment, a base station may send one or more candidate multi-SIM problems to the terminal. The terminal is instructed to send the multi-SIM problem notification to the base station in response to determining that the multi-SIM problem that is occurring or will occur belongs to the candidate multi-SIM problems.

The base station may determine one or more candidate multi-SIM problems based on its own capability information and send the determined candidate multi-SIM problems to the terminals. Therefore, a terminal can receive one or more candidate multi-SIM problems sent by the base station, and send a multi-SIM problem notification to the base station if the multi-SIM problem that is occurring or will occur is a candidate multi-SIM problem. If the multi-SIM problem that is occurring or will occur is not a candidate multi-SIM problem, the terminal does not send a multi-SIM problem notification to the base station.

Accordingly, the base station may pre-specify the candidate multi-SIM problems. Thus, the terminal does not report whenever any multi-SIM problem occurs, but reports when a candidate multi-SIM problem occurs. It can be understood that for a non-candidate multi-SIM problem, even if the terminal reports the multi-SIM problem notification to the base station, the base station does not need to know the information so far, which wastes communication resources. Thus, according to the above embodiment, unnecessary notification sending by the terminal can be reduced, and the communication efficiency between the base station and the terminal can be improved.

In an embodiment, a base station may send a multi-SIM problem acquiring request to the terminal, and receive the multi-SIM problem information returned by the terminal. Wherein the multi-SIM problem information indicates that at least one multi-SIM problem is occurring or will occur in the terminal.

For example, a base station may send a multi-SIM problem acquiring request to the terminal through RRC signaling. The multi-SIM problem acquiring request may be carried in the UEInformationRequest signaling to be sent to the terminal, and further, the base station may also add a new information unit in the UEInformationRequest signaling, such as a MUSIMProblemReq information unit carrying the multi-SIM problem acquisition request.

A base station may receive multi-SIM problem information returned by a terminal. For example, the multi-SIM problem information may comprise at least one problem identifier corresponding to the at least one multi-SIM problem, respectively, so that the base station may determine each of the multi-SIM problems, which is occurring or will occur in the terminal based on each of the problem identifiers.

In an embodiment, multi-SIM problem information comprises at least one of the following: at least one multi-SIM problem, a cause of the at least one multi-SIM problem; a frequency of the at least one multi-SIM problem; a solution for the at least one multi-SIM problem; configuration information related to a multi-SIM function of the terminal; and identity information of the terminal.

A base station may solve the at least one multi-SIM problem in the terminal based on the received multi-SIM problem information. For example, a base station may determine configuration information for solving the at least one multi-SIM problem, and send the configuration information to the terminal. Therefore, the terminal may receive the configuration information sent by the base station and configure the configuration information to solve at least one multi-SIM problem. When determining to solve the multi-SIM problem in the terminal, the base station may solve all the multi-SIM problems in the terminal, or may only solve one or more of them.

In an embodiment, when a base station determines the method for solving the multi-SIM problem in the terminal, the base station may solve the multi-SIM problem in the terminal according to the multi-SIM problem information sent by the terminal. For example, the base station may determine whether to solve the multi-SIM problem in the terminal, or determine which method is used to solve the multi-SIM problem, and the like, according to the cause and the frequency of the multi-SIM problems in the terminal.

In an embodiment, a terminal may send the multi-SIM problem notification to a base station during the process of establishing the RRC connection with the base station. A base station may receive a RRC connection establishment request sent by a terminal, wherein the RRC connection establishment request carries a multi-SIM problem notification. Thus, the base station may determine whether to establish a RRC connection with the terminal or not based on the multi-SIM problem notification.

For example, after receiving a multi-SIM problem notification, the base station may determine that a multi-SIM problem is occurring or will occur in the terminal. Thus, the base station may determine whether to establish a RRC connection with the terminal according to its own capability. For example, if the base station has the capability of solving the multi-SIM problem, it accepts the establishment of the RRC connection with the terminal. Alternatively, if the base station does not have the capability of solving the multi-SIM problem, it refuses the establishment of the RRC connection with the terminal. For example, it may refuse a RRC connection establishment request from the terminal.

Accordingly, the base station may determine whether to establish a RRC connection with the terminal according to the multi-SIM problem notification reported by the terminal. Thus, preventing the terminal from accessing a base station that cannot solve the multi-SIM problem, thereby improving user experience and communication efficiency between the base station and the terminal.

Corresponding to the foregoing embodiment of the information sending method, the present disclosure also provides an embodiment of an information sending device.

Figure 6:
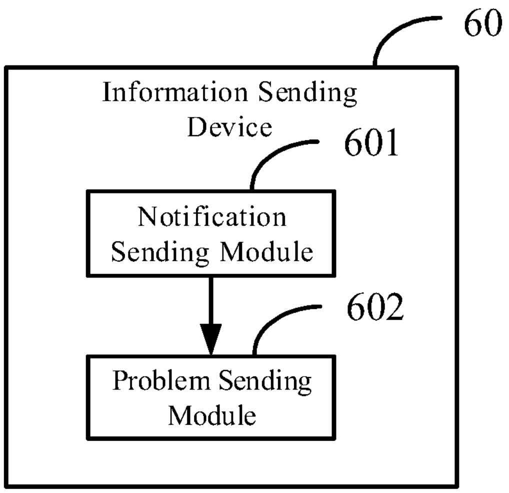
FIG. 6 illustrates a schematic block diagram of an information sending device according to an embodiment of the present disclosure.

FIG. 6 is a schematic block diagram of an information sending device 60 according to an embodiment of the present disclosure. The information sending device shown in this embodiment may apply to a terminal. The terminal comprises, but is not limited to, electronic devices such as a mobile phone, a tablet computer, a wearable device, a sensor, and an Internet of Things device. The terminal may communicate as a user device with a base station, and the base station comprises, but is not limited to, a 4G base station, a 5G base station, and a 6G base station. In an embodiment, the base station may be a base station to which the information sending device described in any one of the subsequent embodiments applies.

As shown in FIG. 6, the information sending device 60 may comprise a notification sending module 601 and a problem sending module 602.

The notification sending module 601 is configured to send a multi-SIM problem notification to the base station. Wherein the multi-SIM problem notification is configured to notify the base station that a multi-SIM problem is occurring or will occur in the terminal.

In an embodiment, the notification sending module 601 is specifically configured to: receive one or more candidate multi-SIM problems sent by the base station; and in response to determining that the multi-SIM problem, which is occurring or will occur, belongs to the candidate multi-SIM problems, send the multi-SIM problem notification to the base station.

The problem sending module 602 is configured to send multi-SIM problem information to the base station in response to the multi-SIM problem acquiring request sent by the base station. Wherein the multi-SIM problem information indicates at least one multi-SIM problem, which is occurring or will occur in the terminal.

In an embodiment, the multi-SIM problem information is used to request the base station to solve at least one of the multi-SIM problems in the terminal. The multi-SIM problem information may comprise at least one problem identifier corresponding to the at least one multi-SIM problem, respectively.

In an embodiment, the multi-SIM problem information comprises at least one of the following: at least one multi-SIM problem; a cause of the at least one multi-SIM problem; a frequency of the at least one multi-SIM problem; a solution for the at least one multi-SIM problem; configuration information related to a multi-SIM function of the terminal; and identity information of the terminal.

In an embodiment, the notification sending module 601 is specifically configured to, in response to the terminal having established a RRC connection with the base station, send the multi-SIM problem notification to the base station with an established RRC connection.

In an embodiment, the terminal is configured with at least two SIM cards, and the terminal has established RRC connections with at least two base stations through the at least two SIM cards. The notification sending module 601 is specifically configured to send the multi-SIM problem notification to at least one base station with an established RRC connection, or send the multi-SIM problem notification to each base station with an established RRC connection.

In an embodiment, the notification sending module 601 is specifically configured to send the multi-SIM problem notification to the base station during the process of establishing the RRC connection with the base station.

In an embodiment, the notification sending module 601 is specifically configured to carry the multi-SIM problem notification in a specific RRC message, which is to be sent to the base station to indicate the completion of RRC connection establishment.

In one embodiment, the specified RRC message comprises at least one of: RRCConnectionReconfigurationComplete signaling, RRCReconfigurationComplete signaling, RRCConnectionReestablishmentComplete signaling, RRCReestablishmentComplete signaling, RRCConnectionResumeComplete signaling, RRCResumeComplete signaling, RRCConnectionSetupComplete signaling, and/or RRCSetupComplete signaling.

In an embodiment, carrying the multi-SIM problem notification in the specific RRC message comprises adding an information unit for carrying the multi-SIM problem notification in the specified RRC message.

In an embodiment, sending the multi-SIM problem notification to the base station during the process of establishing the RRC connection with the base station comprises: carrying the multi-SIM problem notification in a RRC connection establishment request. Wherein the RRC connection establishment request is sent to the base station, and the base station is instructed to determine whether to establish a RRC connection with the terminal or not based on the multi-SIM problem notification.

Corresponding to the foregoing embodiments of the information receiving method, the present disclosure further provides an embodiment of an information receiving device.

Figure 7:
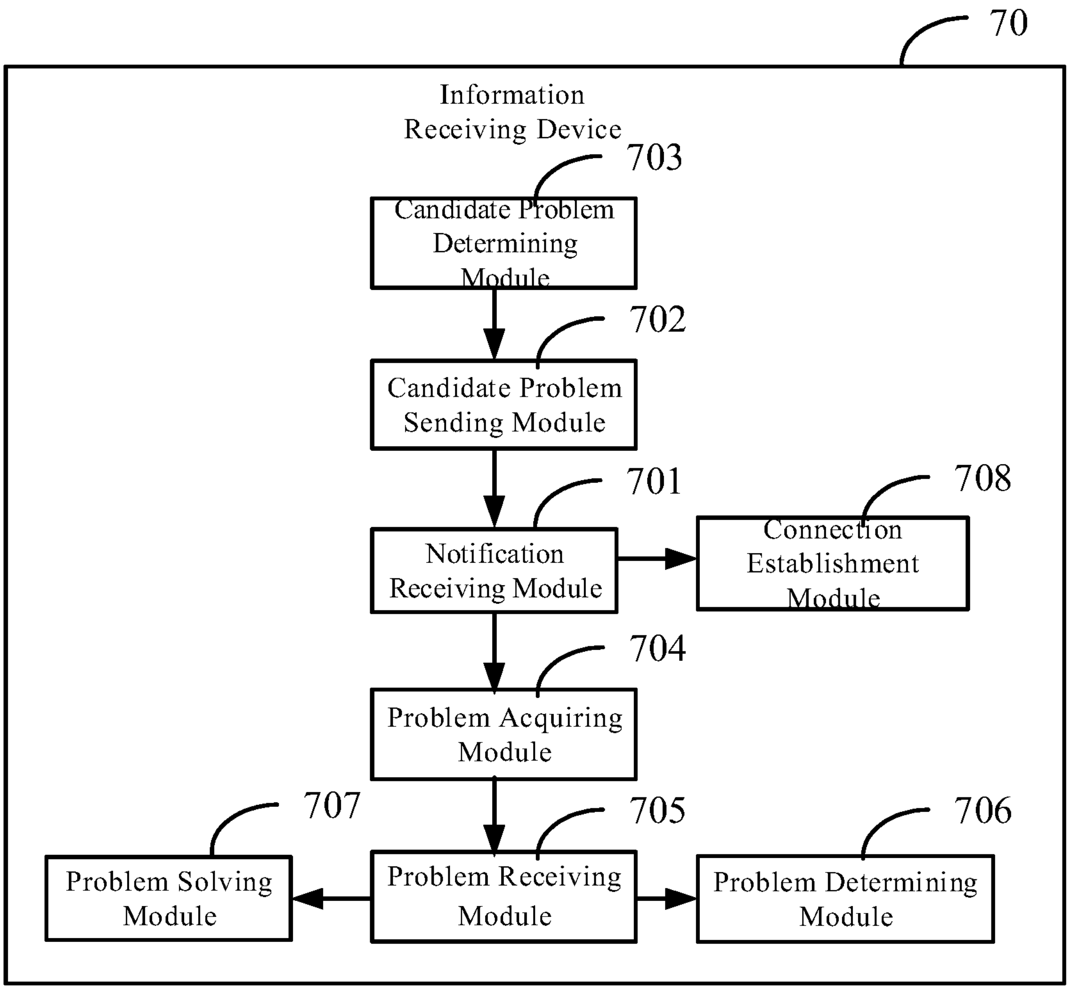
FIG. 7 illustrates a schematic block diagram of an information receiving device according to an embodiment of the present disclosure.

FIG. 7 is a schematic flow chart of an information receiving device 70 according to an embodiment of the present disclosure. The information receiving device 70 shown in this embodiment may apply to a base station, and the base station comprises, but is not limited to, a 4G base station, a 5G base station, and a 6G base station. The base station may communicate with a terminal serving as a user device, and the terminal comprises, but is not limited to, an electronic device such as a mobile phone, a tablet computer, a wearable device, a sensor, and an Internet of Things device. In an embodiment, the terminal may be a terminal to which the information receiving device applies to any one of the included embodiments.

As shown in FIG. 7, the information receiving device 70 may comprise a notification receiving module 701, a candidate problem sending module 702, a candidate problem determining module 703, a problem acquiring module 704, a problem receiving module 705, a problem determining module 706, a problem solving module 707, and a connection establishment module 708.

The notification receiving module 701 is configured to, in response to receiving the multi-SIM problem notification sent by the terminal, determine that a multi-SIM problem is occurring or will occur in the terminal.

The candidate problem sending module 702 is configured to send one or more candidate multi-SIM problems to the terminal. The terminal is instructed to send the multi-SIM problem notification to the base station in response to determining that the multi-SIM problem, which is occurring or will occur, belongs to the candidate multi-SIM problems.

The candidate problem determining module 703 is configured to determine the one or more candidate multi-SIM problems based on the capability information of the base station.

The problem acquiring module 704 is configured to send a multi-SIM problem acquiring request to the terminal.

The problem receiving module 705 is configured to receive multi-SIM problem information returned by the terminal. Wherein the multi-SIM problem information indicates that at least one multi-SIM problem is occurring or will occur in the terminal.

In an embodiment, the multi-SIM problem information comprises at least one problem identifier corresponding to the at least one multi-SIM problem, respectively.

The problem determining module 706 is configured to determine each multi-SIM problem, which is occurring or will occur in the terminal, based on each problem identifier.

In an embodiment, the multi-SIM problem information comprises at least one of the following: at least one multi-SIM problem; a cause of the at least one multi-SIM problem; a frequency of the at least one multi-SIM problem; a solution for the at least one multi-SIM problem; configuration information related to a multi-SIM function of the terminal; and identity information of the terminal.

In an embodiment, the problem obtaining module 704 is specifically configured to carry the multi-SIM problem acquisition request in the UEInformationRequest signaling to be sent to the terminal. Carrying the multi-SIM problem acquisition request in the UEInformationRequest signaling to be sent to the terminal comprises: adding an information unit for carrying the multi-SIM problem acquisition request in the UEInformationRequest signaling.

The problem solving module 707 is configured to solve the at least one multi-SIM problem in the terminal based on the multi-SIM problem information. In an embodiment, the problem solving module 707 is specifically configured to determine the configuration information for solving the at least one multi-SIM problem, and send the configuration information to the terminal.

The connection establishment module 708 is configured to receive a RRC connection establishment request sent by a terminal. Wherein the RRC connection establishment request carries the multi-SIM problem notification; and the connection establishment module 708 determines whether to establish a RRC connection with the terminal or not based on the multi-SIM problem notification.

With regard to the devices in the above embodiments, the specific manner in which each module performs operations has been described in detail in the embodiments of the related method, and will not be described in detail herein. Thus, for the device embodiments, one of skill in the art would understand to refer to the relevant part of the description of the method embodiment. The embodiments of the devices described herein are merely schematic, wherein the modules illustrated as separate components may or may not be physically separate. The components shown as modules may or may not be physical modules, i.e., they may be located in one place, or may be distributed over a plurality of network modules. Some or all of the modules may be selected according to actual needs to fulfill the purpose of this embodiment scheme. It can be understood and implemented by those of ordinary skill in the art without creative labor. The modules may be any known device capable of performing the included function, and, for example, may be any type of known processor or processing component, memory, communication device, input/output device, or the like. Additionally, the modules may be any of the components described with reference to either FIG. 8 or 9.

A specific charging method according to the present disclosure is generally illustrated below in conjunction with specific technical details, as follows.

With the development of wireless communication technology, there are more and more multi-SIM mobile phones in the market. Typical application scenarios of multi-SIM mobile phones comprise: business users having a private card and a business card, and putting the two cards on the same mobile phone; normal users having multiple private cards, and able to choose which card to use according to the business. These cards may be from the same operator or from different operators.

At present, the processing method for multi-SIM mobile phones is mainly based on the implementation of each terminal manufacturer, and there is no unified standard for regulation, which leads to many different terminal behaviors and processing methods (such as dual-card single-standby, dual-card dual-standby single-pass, dual-card dual-standby dual-pass, etc.), and may lead to the following problems.

When a multi-SIM terminal communicates with the first system, it needs to detect the second system from time to time, such as listening for paging, measuring, reading system messages, etc., which may have an impact on the performance of the first system.

The paging time is calculated according to the identifier of the UE, and the multi-SIM terminal may cause systematic paging collision due to multiple SIM cards.

When the multi-SIM terminal receives a paging message on the second system, it needs to decide whether it needs to respond to the paging, and this is based on the rules configured by the user.

When the multi-SIM terminal decides to respond to a paging message from the second system, it needs to stop the current operation in the first system. If there is a lack of a suspension mechanism for the current activity, the UE is to automatically disconnect the RRC connection with the first system and leave. Moreover, after the UE leaves, the first system continues to page the UE, resulting in a waste of paging resources.

When a terminal reads the paging or measurement in the second system, a short interval of about 20 ms may be caused in the first system, which is similar to experiencing shadow fading for the first system. However, since it occurs once per paging cycle, it may affect the power control and link adaptation algorithm of the network, thereby causing a waste of resources in the first system.

When the terminal decides to switch to the cell of the second system, it needs to read the system information from the second system, which will cause a long interval of about 1 second in the first system, and the first system is to regard this as an error. It is uncertain how the UE and the network will handle this situation at present.

When the terminal performs Tracking Area Update (TAU) in the second system, it will cause a longer interval of several seconds in the first system. Therefore, the impact on the first system is greater.

The present invention provides a method for reporting multi-SIM problems.

When a problem caused by multiple cards occurs, a multi-SIM terminal may report multi-SIM problem information to the base station. The multi-SIM terminal reports to the base station with RRC connection.

If there are multiple base stations with RRC connections, the multi-SIM terminal selects one base station to report the problem, or all base stations may be reported with the problem.

The problems caused by multiple cards may comprise paging collision caused by multiple cards, interruption of the current communication link caused by multiple cards, and failure to connect the service to be connected caused by multiple cards. Problems caused by multiple cards can be identified by one-to-one correspondence with integer values, or by character strings.

A multi-SIM terminal with a multi-SIM problem can inform the serving base station about the multi-SIM problem information it has through RRC signaling during the process of establishing a RRC connection with the serving base station (i.e., changing to the connected state).

This may be through RRCConnectionReconfigurationComplete signaling or RRCReconfigurationComplete signaling; RRCConnectionReestablishmentComplete signaling or RRCReestablishmentComplete signaling; RRCConnectionResumeComplete signaling or RRCResumeComplete signaling; and/or RRCConnectionSetupComplete signaling or RRCSetupComplete signaling.

In an embodiment, this may be informed by adding a new MUSIMProblemAvailable information unit in these signalings.

After receiving the RRC signaling, the base station learns that the multi-SIM terminal has a multi-SIM problem.

If the base station wants to acquire the multi-SIM problem of the multi-SIM terminal, it requests the multi-SIM terminal to acquire the multi-SIM problem existing in the multi-SIM terminal through RRC signaling.

The request can be made through UEInformationRequest signaling. Specifically, the request may be made by adding a new MUSIMProblemReq information unit in the UEInformationRequest signaling.

After receiving the RRC signaling with the multi-SIM problem request sent by the base station, the multi-SIM terminal with the multi-SIM problem sends its own multi-SIM problem to the base station through the RRC signaling. This may be through UEInformationResponse signaling, and specifically, it may be sent by adding a new MUSIMProblemReport information unit in the UEInformationResponse signaling.

When reporting the multi-SIM problem information to the base station, the multi-SIM terminal may report the occurring multi-SIM problem, the cause of the occurring multi- SIM problem, the frequency of the occurring multi-SIM problem, configuration information of the multi-SIM terminal, identity information of the multi-SIM terminal, recommended solutions, etc.

After receiving the multi-SIM problem reported from the multi-SIM terminal, the base station may configure the configuration reported for the problem to solve the multi-SIM problem.

The embodiment of the present disclosure further provides an electronic device, comprising: a processor; and a memory for storing processor executable instructions. Wherein the processor is configured to implement at least one of the information sending method and/or the information receiving method.

The embodiment of the present disclosure also proposes a non-transitory computer readable storage medium, on which a computer program is stored. When the program is executed by a processor, steps in the information sending method and/or the information receiving method are implemented.

Figure 8:
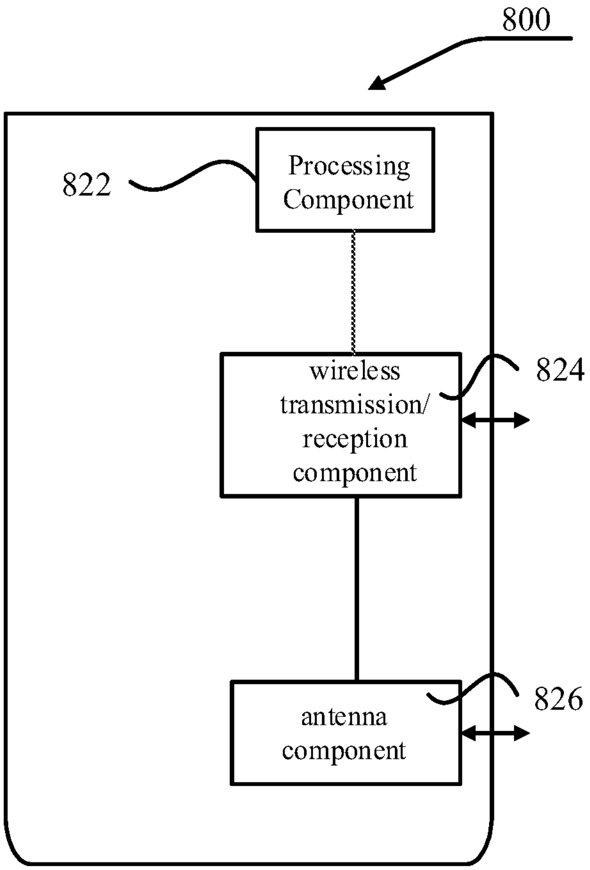
FIG. 8 illustrates a schematic block diagram of an information receiving device according to an embodiment of the present disclosure.

As shown in FIG. 8, FIG. 8 is a schematic block diagram of an information receiving device 800 according to an embodiment of the present disclosure. The device 800 can be provided as a base station. Referring to FIG. 8, the device 800 comprises a processing component 822, a wireless transmission/reception component 824, an antenna component 826, and a signal processing portion specific to a wireless interface (not shown). The processing component 822 may further comprise one or more processors (not shown). One of the processors in the processing component 822 may be configured to implement the information receiving method described above.

Figure 9:
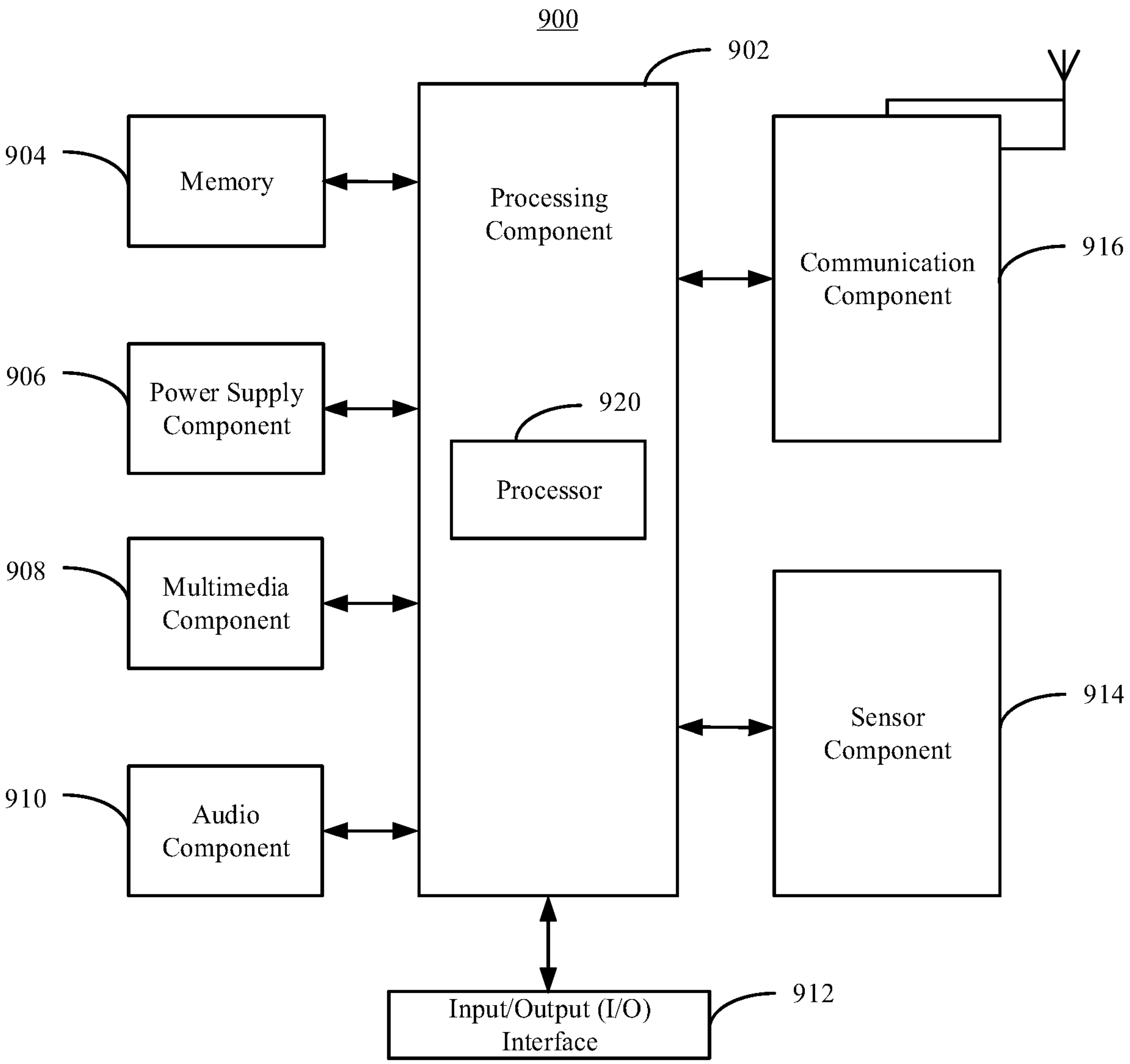
FIG. 9 illustrates a schematic block diagram of an information sending device according to an embodiment of the present disclosure.

FIG. 9 is a schematic block diagram of an information sending device 900 according to an embodiment of the present disclosure. For example, the device 900 may be a mobile phone, a computer, a digital broadcast terminal, a messaging transceiver, a game console, a tablet device, a medical device, a fitness device, a personal digital assistant, etc.

Referring to FIG. 9, a device 900 may comprise one or more of the following components: a processing component 902, a memory 904, a power supply component 906, a multimedia component 908, an audio component 910, an input/output (I/O) interface 912, a sensor component 914, and a communication component 916.

The processing component 902 generally controls the overall operations of the device 900, such as operations associated with displaying, phone calls, data communications, camera operations, and recording operations. The processing component 902 may comprise one or more processors 920 to execute instructions to complete some or all of the steps of the information sending method described above. In addition, the processing component 902 may comprise one or more modules to facilitate interactions between the processing component 902 and other components. For example, processing component 902 may comprise a multimedia module to facilitate interactions between the multimedia component 908 and the processing component 902.

The memory 904 is configured to store various types of data to support operations on the device 900. Examples of such data comprise instructions for any application or method operating on the device 900, contact data, phonebook data, messages, pictures, videos, etc. The memory 904 may be implemented by any type of volatile or non-volatile memory device or a combination thereof, such as static random access memory (SRAM), electrically erasable programmable read-only memory (EEPROM), erasable programmable read-only memory (EPROM), programmable read-only memories (PROM), read-only memories (ROM), magnetic memory, flash memory, disks or optical disks.

The power supply component 906 provides power to the various components of the device 900. Power supply component 906 may comprise a power management system, one or more power supplies, and other components associated with generating, managing, and distributing power for device 900.

The multimedia component 908 comprises a screen providing an output interface between the device 900 and a user. In some embodiments, the screen may comprise a liquid crystal display (LCD) and a touch panel (TP). If the screen comprises a touch panel, the screen may be implemented as a touch screen to receive input signals from a user. The touch panel comprises one or more touch sensors to sense touches, swipes, and gestures on the touch panel. The touch sensor may not only sense the boundary of a touch or a swipe action, but also detect the duration and the pressure associated with the touch or the sliding action. In some embodiments, the multimedia component 908 comprises a front facing camera and/or a rear facing camera. When the device 900 is in operating mode, such as shooting mode or video mode, the front facing camera and/or the rear facing camera may receive external multimedia data. Each front facing camera and rear facing camera can be a fixed optical lens system or have focal length and optical zoom capabilities.

The audio component 910 is configured to output and/or input audio signals. For example, the audio component 910 comprises a microphone (MIC), and when the device 900 is in operating mode, such as calling mode, recording mode, and speech recognition mode, the microphone is configured to receive external audio signals. The received audio signals may be further stored in the memory 904 or transmitted via communication component 916. In some embodiments, the audio component 910 further comprises a speaker for outputting audio signals.

The I/O interface 912 provides an interface between the processing component 902 and peripheral interface modules, and the peripheral interface modules may be a keyboard, a click wheel, buttons, etc. These buttons may comprise, but are not limited to: a home button, a volume button, a launch button, and a lock button.

The sensor component 914 comprises one or more sensors for providing a state assessment of various aspects of the device 900. For example, sensor component 914 may detect the on/off status of device 900, relative positioning of the components, and the components are, for example, a display and a keypad of device 900, and the sensor component 914 may further detect the change in the position of device 900 or a component of the device 900, the presence or absence of user contact with device 900, the orientation or acceleration/deceleration of the device 900 and the temperature change of the device 900. The sensor component 914 may comprise a proximity sensor configured to detect the presence of a nearby object in the absence of any physical contact. The sensor component 914 may also comprise an optical sensor, such as a CMOS or CCD image sensor, for use in imaging applications. In some embodiments, the sensor component 914 may further comprise an acceleration sensor, a gyro sensor, a magnetic sensor, a pressure sensor, or a temperature sensor.

The communication component 916 is configured to facilitate wired or wireless communication between the device 900 and other devices. The device 900 may access a wireless network based on a communication standard, such as WiFi, 2G or 3G, 4G LTE, 5G NR, or a combination thereof. In an exemplary embodiment, the communication component 916 receives broadcast signals or broadcast associated information from an external broadcast management system via a broadcast channel. In an exemplary embodiment, the communication component 916 also comprises a near field communication (NFC) module to facilitate short-range communications. For example, the NFC module may be implemented based on Radio Frequency Identification (RFID) technology, Infrared Data Association (IrDA) technology, Ultra Wideband (UWB) technology, Bluetooth (BT) technology, and other technologies.

In an example embodiment, the device 900 may be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors, or other electronic elements for executing the above described information sending method.

In an exemplary embodiment, a non-transitory computer-readable storage medium comprising instructions is also provided, such as memory 904 comprising instructions, and the instructions are executable by processor 920 of device 900 to perform the information sending method described above. For example, the non-transitory computer readable storage medium may be a ROM, random access memory (RAM), CD-ROM, magnetic tape, floppy disk, optical data storage device, and the like.

After considering the disclosure of the specification and practices disclosed herein, those skilled in the art will easily come up with other implementation solutions disclosed herein. The purpose of the present disclosure is to cover any variations, uses, or adaptive changes of the present disclosure, which follow the general principles of the present disclosure and comprise common knowledge or common technical means in the art not disclosed herein. The specification and embodiments are only regarded as exemplary, and the true scope and spirit of the present disclosure are indicated by the following claims.

It is to be understood that the present disclosure is not limited to the precise structures which have been described above and shown in the attached drawings, and that various modifications and changes may be made without departing from the scope thereof. The scope of the present disclosure is limited only by the appended claims.

It should be noted that relational terms such as first and second and the like may be used herein only to distinguish one entity or operation from another entity or operation without necessarily requiring or implying any such actual relationship or order between such entities or operations. The terms "comprises," "comprising," or any other variation thereof, are intended to cover a non-exclusive inclusion, such that a process, a method, an object, or a device that comprises a list of elements does not comprise only those elements but may comprise other elements not expressly listed or inherent to such process, method, object, or device. Without further limitation, the fact that an element is defined by the phrase "comprising a . . . " does not exclude the presence of another identical element in the process, method, object, or device comprising the element.

The above detailed description of the methods and devices provided by the embodiments of the present disclosure is provided herein, and specific examples are applied herein to illustrate the principles and implementations of the present disclosure, and the above illustrations of the embodiments are only used to assist in the understanding of the methods of the present disclosure and the core ideas thereof; at the same time, for those of ordinary skill in the field, based on the ideas of the present disclosure, there will be changes in the specific implementations and the scope of application, and in summary, the contents of the specification should not be understood as a limitation of the present disclosure.

The invention claimed is:

1. An information sending method applied to a wireless mobile terminal, wherein the method comprises:

sending a multi-Subscriber Identity Module (SIM) problem notification to a base station, wherein the multi-SIM problem notification is configured to notify the base station that a multi-SIM problem is occurring or will occur in the wireless mobile terminal, and the multi-SIM problem comprises communication conflicts that occur in communication operations corresponding to a multi-SIM;

wherein sending the multi-SIM problem notification to the base station comprises:

during a process for establishing an RRC connection with the base station:

receiving one or more candidate multi-SIM problems sent by the base station;

determining the multi-SIM problem which is occurring or will occur within the wireless mobile terminal;

comparing the multi-SIM problem which is occurring or will occur within the wireless mobile terminal with the one or more candidate multi-SIM problems;

determining whether the multi-SIM problem which is occurring or will occur within the wireless mobile terminal belongs to the one or more candidate multi-SIM problems; and in response to determining that the multi-SIM problem which is occurring or will occur belongs to the one or more candidate multi-SIM problems, sending the multi-SIM problem notification to the base station through an RRC connection establishment request so that the base station determines whether to establish the RRC connection based on the multi-SIM problem notification.

2. The method according to claim 1, further comprises:

in response to a multi-SIM problem acquisition request sent by the base station, sending multi-SIM problem information to the base station, and wherein the multi-SIM problem information indicates at least one multi-SIM problem is occurring or will occur in the terminal.

3. The method according to claim 2, wherein the multi-SIM problem information is used to request the base station to solve the at least one multi-SIM problem in the terminal.

4. The method according to claim 2, wherein the multi-SIM problem information comprises at least one problem identifier corresponding to each of the at least one multi-SIM problem respectively.

5. The method according to claim 2, wherein the multi-SIM problem information further comprises at least one of:

a cause of the at least one multi-SIM problem;

a frequency of the at least one multi-SIM problem;

a solution for the at least one multi-SIM problem;

configuration information related to a multi-SIM function of the terminal; or identity information of the terminal.

6. The method according to claim 1, wherein sending the multi-SIM problem notification to the base station during the process of establishing RRC connection with the base station comprises:

carrying the multi-SIM problem notification in the RRC connection establishment request, wherein the RRC connection establishment request is sent to the base station and the base station is instructed to determine whether to establish an RRC connection with the terminal based on the multi-SIM problem notification.

7. An information receiving method applied to a base station, wherein the method comprises:

determining one or more candidate multi-SIM problems;

generating a message comprising the one or more candidate multi-SIM problems;

sending the message to a wireless mobile terminal to instruct the wireless mobile terminal to send a multi-SIM problem notification to the base station in response to determining that a multi-SIM problem which is occurring or will occur belongs to the one or more candidate multi-SIM problems;

receiving the multi-Subscriber Identity Module (SIM) problem notification through an RRC connection establishment request sent by the wireless mobile terminal;

determining that the multi-SIM problem is occurring or will occur in the wireless mobile terminal, wherein the multi-SIM problem notification is sent by the wireless mobile terminal during a process for establishing an RRC connection with the base station, and the multi-SIM problem comprises communication conflicts that occur in communication operations corresponding to a multi-SIM; and determining whether to establish an RRC connection with the terminal based on the multi-SIM problem notification.

8. The method according to claim 7 further comprises:

determining the one or more candidate multi-SIM problems based on capability information of the base station.

9. The method according to claim 7 further comprises:

sending a multi-SIM problem acquisition request to the terminal;

receiving multi-SIM problem information returned by the terminal, wherein the multi-SIM problem information indicates that at least one multi-SIM problem is occurring or will occur in the terminal; and solving the at least one multi-SIM problem in the terminal based on the multi-SIM problem information.

10. The method according to claim 9, wherein the multi-SIM problem information comprises at least one problem identifier corresponding to each of the at least one multi-SIM problem respectively; and the method further comprises determining each of the at least one multi-SIM problem which is occurring or will occur in the terminal based on each of the at least one problem identifier.

11. The method according to claim 9, wherein sending the multi-SIM problem acquisition request to the terminal comprises:

carrying the multi-SIM problem acquisition request in a UEInformationRequest signaling to be sent to the terminal.

12. The method according to claim 9, wherein solving the at least one multi-SIM problem in the terminal comprises:

determining configuration information for solving the at least one multi-SIM problem; and sending the configuration information to the terminal.

13. The method according to claim 7 further comprises:

receiving a radio resource control (RRC) connection establishment request sent by the terminal, wherein the RRC connection establishment request carries the multi-SIM problem notification; and determining whether to establish an RRC connection with the terminal based on the multi-SIM problem notification.

14. A wireless mobile electronic device, comprising:

a processor; and a memory for storing processor executable instructions and being communicatively connected to the processor, wherein the processor is configured to:

send a multi-Subscriber Identity Module (SIM) problem notification to a base station, wherein the multi-SIM problem notification is configured to notify the base station that a multi-SIM problem is occurring or will occur in a wireless mobile terminal, and the multi-SIM problem comprises communication conflicts that occur in communication operations corresponding to a multi-SIM;

wherein sending the multi-SIM problem notification to the base station comprises:

during a process for establishing an RRC connection with the base station:

receiving one or more candidate multi-SIM problems sent by the base station;

determining the multi-SIM problem which is occurring or will occur within the wireless mobile terminal;

comparing the multi-SIM problem which is occurring or will occur within the wireless mobile terminal with the one or more candidate multi-SIM problems;

determining whether the multi-SIM problem which is occurring or will occur within the wireless mobile terminal belongs to the one or more candidate multi-SIM problems; and in response to determining that the multi-SIM problem which is occurring or will occur belongs to the one or more candidate multi-SIM problems, sending the multi-SIM problem notification to the base station through an RRC connection establishment request so that the base station determines whether to establish the RRC connection based on the multi-SIM problem notification.

15. A non-transitory computer readable storage medium storing a computer program, wherein the program, when executed by a processor, implements steps of the information sending method according to claim 1.

16. An electronic device, comprising:

a processor; and a memory for storing processor executable instructions, and being communicatively connected to the processor, and wherein, the processor is configured to implement the information receiving method according to claim 7.

* * * * *